United States Patent [19]

Wible et al.

[11] Patent Number: 5,780,737
[45] Date of Patent: Jul. 14, 1998

[54] THERMAL FLUID FLOW SENSOR

[75] Inventors: Eric J. Wible, Encinitas; Fritz J. Stumpges, Vista; Glenn S. Oberholtz, Cardiff, all of Calif.

[73] Assignee: Fluid Components Intl, San Marcos, Calif.

[21] Appl. No.: 798,635

[22] Filed: Feb. 11, 1997

[51] Int. Cl.$^6$ .................................................. G01F 1/68
[52] U.S. Cl. .......................... 73/204.22; 73/204.21; 73/204.23; 73/204.11; 73/866.5
[58] Field of Search ................ 73/202.5, 204.11, 73/204.12, 204.19, 204.21, 204.22, 204.23, 204.25, 866.5

[56] References Cited

U.S. PATENT DOCUMENTS

| | | | |
|---|---|---|---|
| 2,652,721 | 9/1953 | McMillan et al. | 73/204.23 |
| 3,366,942 | 1/1968 | Deane | 340/243 |
| 3,927,567 | 12/1975 | Novak et al. | 73/204.22 |
| 4,561,302 | 12/1985 | Sumal et al. | 73/202.5 |
| 4,899,584 | 2/1990 | McQueen | 73/204.21 |
| 5,226,729 | 7/1993 | Alford | 73/204.22 |

*Primary Examiner*—Ronald L. Biegel
*Assistant Examiner*—Max H. Noori
*Attorney, Agent, or Firm*—Baker, Maxham, Jester & Meador

[57] ABSTRACT

An insertion mass flow sensor having coaxial, spaced reference and active sensors mounted within an opening adjacent the distal end of the elongated flow element. The distal end of the flow element is adapted to be positioned at the center of the conduit through which fluid is flowing. In the preferred embodiment, a turbulence inducing element is mounted across the opening to condition the fluid that encounters the active sensor.

21 Claims, 4 Drawing Sheets

THERMAL FLUID FLOW SENSOR

BACKGROUND

1. Field of the Invention

This invention relates generally to mass flow sensors and more particularly to a thermal dispersion mass flow meter employing resistance temperature detection elements.

2. Description of the Related Art

Thermal dispersion mass flow meters are a common choice for flow metering devices in the commercial and industrial metering markets. A typical sensor element for use in such meters is the resistance temperature detector (RTD), the resistance of which is related to the temperature of the element itself. A typical sensor employs at least two RTD elements. One of them is referred to as a reference element and is normally unheated. The active RTD element is heated and the effect of mass flow on the heated element provides a measure of the flow velocity of the substance in the duct being monitored. Of course, the density of the fluid, normally a gas, flowing across the active RTD is also a factor in the amount of heat dissipated from that RTD. In any particular measurement situation, fluid density will be a constant so it can easily be accounted for in the system.

Two different methods are commonly used in the thermal dispersion industry to determine the mass flow in a conduit. One is configured to maintain a constant temperature differential between the reference RTD and the active RTD. This method measures the voltage or current required to maintain the active RTD at a constant temperature above the reference RTD while heat is removed from the active RTD by way of the physical properties of the flowing fluid. The other method measures the voltage difference between the active and the reference RTD's while the active RTD is heated by a constant current or a constant power heat source. During this measurement, as with the other method, the active RTD loses heat by way of the physical properties of the flowing media.

There are many configurations of dispersion mass flow sensors, and more particularly, of heated RTD type sensors. An early such flow detector is shown in U.S. Pat. No. 3,366,942. This patent discloses a reference sensor, a heated or active sensor, and a separate heating element located closely adjacent the heated sensor element. The basic principal of operation of dispersion flow meters is discussed in this patent. A different configuration of a three-element thermal dispersion sensor is shown in U.S. Pat. No. 4,899,584. There are many other examples of detectors employing differential temperature sensors, some having three elements as described in the patents mentioned above, and some having two elements, where the active sensor has the heater integral therewith. Even a single element differential temperature sensor may be employed. The single element sensor works on a time sharing basis where it acts as a reference sensor part of the time and is then heated to act as the active sensor in relatively rapid succession.

Most of the known differential temperature sensors are configured with the reference and heated sensors arranged in parallel. They are mounted in the fluid conduit and project into the flow path as an insertion flow sensor. The sensor elements are positioned to permit unobstructed flow fluid past both the heated sensor and the reference sensor in such a way that one does not thermally influence the other. That means that the reference sensor must indeed be a reference with respect to the fluid being sensed without influence from the heat of the heated sensor or the fluid heated by the heated sensor. An example of a prior art thermal insertion flow sensor for gasses is shown in FIG. 1 which will be described in greater detail in the detailed description. The flow element in the form of a sensor arm or boom projects into the fluid flow conduit and is configured with at least two openings, across which are mounted a reference sensor and an active sensor. As the fluid being sensed flows through the openings, it enables the two sensors to function in the normal way with relatively little interference with the fluid flow. This structure is designed to provide multiple inputs and may have many independent thermal flow elements, four of which are shown in FIG. 1, in a single conduit. This enables the microprocessor-based electronics to have a large number of inputs and thereby provide a very accurate representation of the flow characteristics. This is especially applicable to large conduits. One limitation on the sensor configuration of FIG. 1 is that the opening across which the thermal sensors are positioned must be relatively precisely aligned with the dominant direction of fluid flow. Otherwise there could be interference with the fluid flow and overlapping of free and forced convective heat transfer phenomena. This results in degradation of accuracy at low flow rates, typically under about 5 feet per second (fps). Furthermore, in the installations of the type for which the FIG. 1 sensors are intended to be used, there can be a degradation of accuracy due to variations in the turbulence intensity in the conduit. These variations are a function of the specific upstream conduit configurations which are unique to each individual flowmeter used.

SUMMARY OF THE INVENTION

Broadly speaking, the present invention provides a differential temperature sensor configuration having improved installation tolerance and high levels of sensor accuracy and repeatability.

In a basic embodiment, the sensor of this invention comprises a single opening through the flow element adjacent its distal end. A reference sensor element projects into the opening from one wall and an active sensor element projects toward the reference sensor element from the opposite wall. The sensors are located on the longitudinal axis of the flow element. The opening is placed in the center of fluid flow in the conduit being monitored in order to have the most representative fluid flow over the sensor elements.

In an alternative embodiment, which is the preferred embodiment of this invention, a flow conditioner is employed to induce turbulence in a predictable way to enhance the accuracy of the readings provided by the active sensor element of the invention.

BRIEF DESCRIPTION OF THE DRAWING

The objects, advantages and features of this invention will be more clearly perceived from the following detailed description, when read in conjunction with the accompanying drawing, in which.

DETAILED DESCRIPTION OF THE PREFERRED EMBODIMENTS

Figure 1:
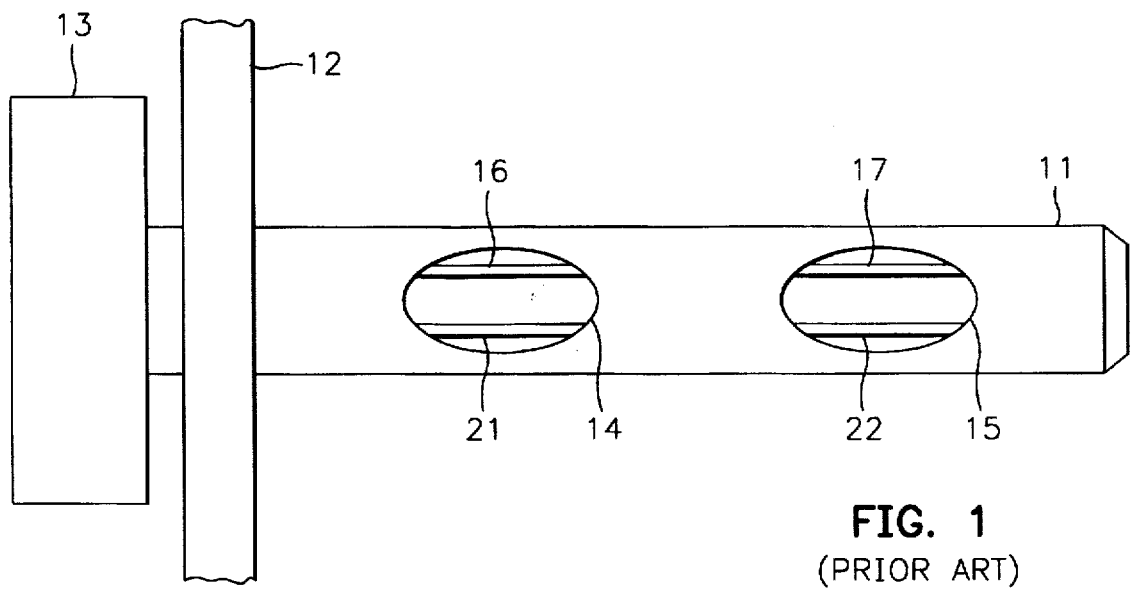
FIG. 1 shows a prior art differential temperature sensor for mass flow metering.

With reference now to the drawing, and more particularly to FIG. 1, there is shown a prior art differential temperature sensor probe or flow element having two pairs of temperature sensor elements. Probe 11 extends through conduit wall 12 and is mounted in some appropriate fashion. In this example, the probe is preferably threaded to the conduit wall. Housing 13 mounted externally of the conduit and integrally connected to probe 11 provides means for external connection and may include electronics for processing signals from the sensors. In openings 14 and 15 are positioned active sensors 16 and 17 and reference sensors 21 and 22. Openings 14 and 15 pass completely through probe 11 and are defined by wall surfaces through which the ends of the sensor elements project. Appropriate wiring is contained within the probe for internal and external connection to each of the sensor elements.

For normal operation, one or more probes 11 would be mounted through the wall 12 of the conduit in such a manner to, as precisely as possible, determine the flow characteristics of the gas through the conduit. There are many arrangements of probes 11 which could be employed, depending upon the size and shape of the conduit and the expected flow characteristics of the gasses therein. In any event, openings 14 and 15 are positioned so that flow will normally be directly through them with as little interference as possible from the probe. Sensors 16 and 17 are heated and will sense the heat dissipation caused by the fluid flow through the openings. The signals from the heated elements are compared with the signals from reference sensors 21 and 22. The electronics provided in housing 13, or in an external computation and processing center, would then manipulate and process the signals from the sensors in order to provide the information desired about the gas flow in the conduit.

Figure 3:
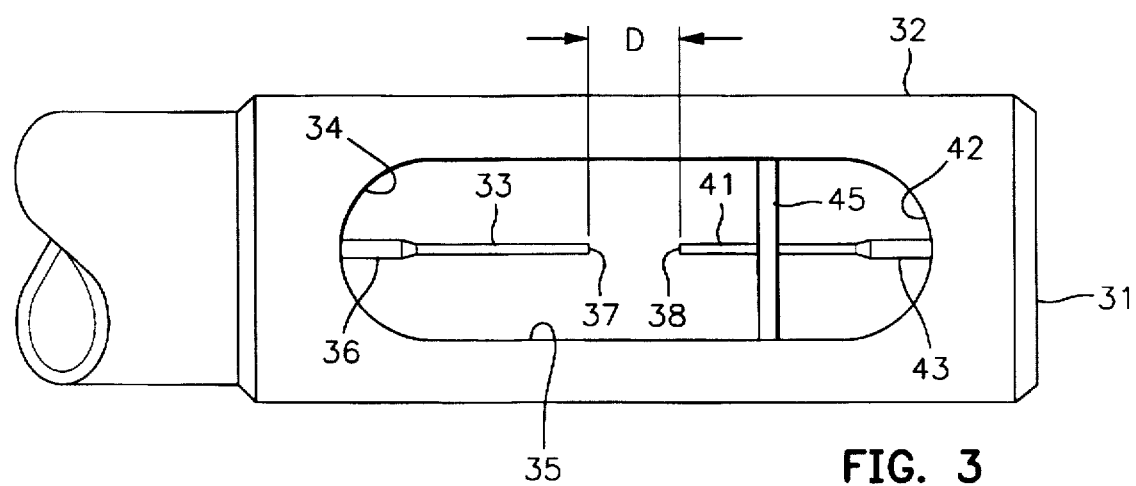
FIG. 3 is an enlarged plan view of the sensor head of FIG. 2.
Figure 2:
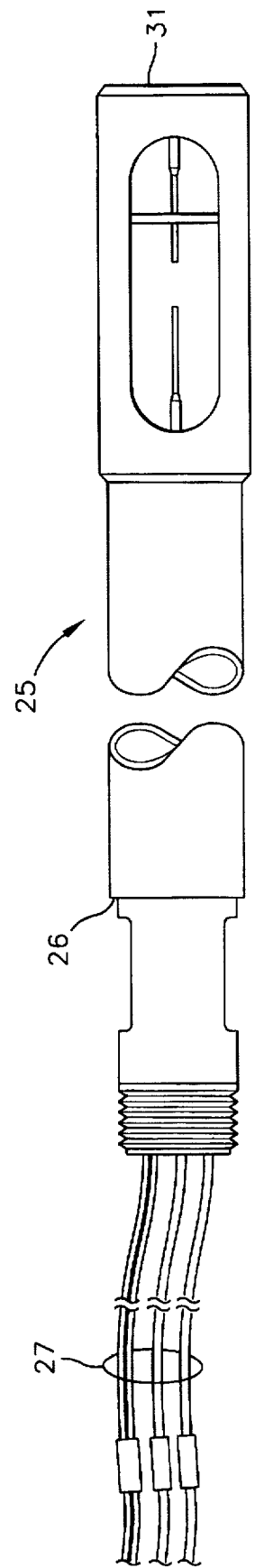
FIG. 2 is a plan view of a preferred embodiment of the sensor of the invention.

This invention in its preferred embodiment form is shown in FIGS. 2 and 3. Probe or flow element 25 is adapted to be connected in the wall of a conduit by appropriate means, such as of threads, adaptors, or couplers, for example. Shoulder 26 would normally be positioned against the inside surface of the conduit wall. Wall 12 and electronics housing 13 are just as applicable to the sensor of FIG. 2, but are omitted for simplicity. Wires 27 provide external connections as required for signal processing and for applying power to heat the active or heated sensor. The length of flow element 25 from shoulder 26 to distal end 31 can be any length for the desired use. Since it is anticipated that the sensor probe of FIG. 2 will be used in pipes with a diameter as small as 2 inches, in that case the probe would be just slightly longer than 1 inch.

Head 32 of flow element 25 is shown in greater detail in FIG. 3. Reference sensor 33 is connected in end wall 34 of opening 35 by means of tube or mount 36. Active sensor 41 is connected in wall 42 by means of tube or mount 43 in such a way that the distance D between ends 37, 38 of sensors 33 and 41 ranges between about 0.30 and 1.00 inch. The preferred embodiment is about 0.30 inch, as will be more fully discussed below. For the embodiment provided as an example here, the length of sensor elements 33 and 41 extending beyond their respective mounts 36 and 43 is about 0.4 inch. The length of mounts 36, 43 is about 0.22 inch. Sensor elements 33 and 41 are preferably on the axis of probe 25 so that if the probe is not mounted with the direction of primary fluid flow exactly parallel to the walls of opening 35 through head 32, there will be no degradation of the accuracy of the signals provided by the sensors. Because they are on the axis, rotation by as much as 5 degrees of the sensor head will not adversely affect the accuracy of the readings provided by the sensors. It can be appreciated that if the sensor elements were coaxial but not on the sensor axis, the sides of opening 35 could act as a baffle and affect the readings. Alternatively, if the sensor elements were not coaxial, a slight rotation of head 32 could make a substantial difference in the flow characteristics of the gas reaching the sensor elements. With even a few degrees of rotation, the non-coaxial sensor elements would be in different positions with respect to the flow direction, causing inaccuracies in the precision of the readings.

It is preferred that the minimum gap D between ends 37 and 38 of the sensor elements be at least 0.30 inch because if they were closer, inaccuracies due to convective heating from the heated element to the reference element could occur, especially at low flows (in the range of one fps, for example). It is also preferred that the gap between ends 37 and 38 not exceed about 1 inch because a larger difference could result in different flow characteristics over each element, just based upon the large spacing and the fact that gas flow is not constant over any appreciable cross-section of the conduit in which flow occurs. Also for dimensional purposes, since flow element 25 and head 32 can be mounted in a conduit having a diameter as small as two inches, the dimensions set forth in this example can accommodate a conduit of that small size. In a two-inch conduit, it is important that the center of distance D between probe ends 37 and 38 be as precisely as possible in the center of the conduit. This is because the center flow and the equal distance on either side of that flow which can be sensed by sensor elements with the dimensions given, is most representative of the gas flow in the conduit. If the sensor head shown in FIG. 3 is mounted in a larger conduit, for example, ranging between three and ten inches in diameter (or across, for non-cylindrical conduits), the position of the center point between sensor ends 37 and 38 could vary by about 1% from the center for a three-inch duct and as much as about 5% from center in a ten-inch duct. That is to say, the center of the gap between the sensor elements should be as close as possible to the center of the fluid flow conduit but some tolerance is permissible.

Further dimensions for the exemplary embodiment of FIG. 3 are that opening 35 would be approximately 0.5 inch wide and the distance between end walls 34 and 42 would be approximately 1.54 inch. Again, this exemplary set of parameters is for the preferred embodiment of the invention. However, a larger or possibly somewhat smaller embodiment of head 32 could be structured but the ratios of the relative length of the sensor elements and their mounts, together with the gap between them, and the opening in which they are mounted, should be relatively consistent with the example given. While opening 35 in head 32 is shown as an elongated oval, the actual shape is a matter of fabrication convenience. For a relatively large conduit, it is possible that opening 35 could be round rather than elongated, because the large conduit could accommodate a larger flow element head. The important thing is that the diameter of head 32 be as small as possible, that the distance between opposing top and bottom walls (with reference to the FIG. 3 orientation) of opening 35 be at least about 0.5 inch and that end walls 34 and 42 be axially spaced a sufficient distance to enable sensor elements, their mounts, their mounting means and the gap between the sensor elements to exist within the relative dimensions given. The body of flow element 25, for the exemplary embodiment described, is preferably about 0.75 inch in diameter, while head 32 is preferably about 0.875 inch in diameter. The diameter of sensors 33 and 41 is preferably about 0.040 inch and mounts 36 and 43 are about 0.050 inch in diameter.

The preferred embodiment of the sensor of FIGS. 2 and 3 includes turbulence inducer 45 which is positioned substantially normal to the axial orientation of active sensor 41 and is spaced upstream within opening 35 by at least about 0.30 inch and preferably no more than about 0.50 inch. The turbulence inducer is referred to as a flow conditioner. If it were positioned any closer to active element 41 than about 0.30 inch, conditioned flow would not be able to be developed by the time the gas encounters the sensor. On the other hand, if the turbulence inducer is spaced more than about 0.50 inch upstream from sensor element 41, it could allow turbulence in the line to creep around the turbulence inducer, thereby reducing its effectiveness and permitting non-conditioned flow to encounter the sensor element, thereby degrading the accuracy of the sensor readings. For a sensor having the dimensions of the examples given above, turbulence inducer 45 could be a wire and should have a cross-section ranging between about 0.062 and 0.093 inch.

The turbulence inducer should be positioned as close as possible to the center of the length of active sensor 41 between mount 43 and end 38. The purpose is to condition the flow of the gas being sensed so that the turbulence is consistent as it passes over the active sensor. By centering turbulence inducer 45 on the length of the active sensor, the flow around the turbulence inducer and then immediately encountering active sensor 41 will be equal and constant over the entire length of the active sensor. It has been found that a turbulence inducer element smaller than about 0.062 inch in cross-section would not create the amount of turbulence necessary to ensure accurate readings by the sensor. On the other hand, if the cross-section of the turbulence inducer is greater than about 0.093 inch it would cause too much turbulence and would effectively block or shade too great a portion of the length of sensor 41. Not only would the turbulence created by a larger turbulence inducer element be greater than desired, it could be inconsistent, and thereby degrade from the desired precision of the sensor readings. Stated another way, the ratio of the length of sensor 41 to the diameter of turbulence inducer 45 should be at least about 4:1. This ensures that the fluid flow is conditioned while at the same time a minimal amount of the length of the active sensor is shaded by the turbulence inducer. For larger conduits to be monitored, where a larger flow element may be used, all of the above dimensions could be different, but the relative sizes hold true.

There are a number of advantages to the structure of the present invention, some of them in particular with respect to the prior art sensor of FIG. 1. Because of the axial arrangement of the active and reference sensors, the outside diameter of probe 25 and head 32 can be of minimal size, thereby creating less impediment to fluid flow in the duct in which it is mounted. Also there are fewer sensor elements than contemplated by the structure of FIG. 1 and, with the axial arrangement, less restriction to the flow through opening 35. Another advantage to the present invention is that the conductive path between the bases of the two sensor elements is much greater than that of the two adjacent sensor elements in the FIG. 1 sensor so there is much less "crosstalk" or conductive thermal interference between the reference sensor and the heated sensor. That is because the distance between the bases as they are connected to end walls 34 and 42, around through the conductive portion of head 32, is many times greater than the distance between the bases of sensors 16 and 21 in FIG. 1, for example. The bases of those two prior art sensors are adjacent to each other and thereby the conductive path, leading to possible thermal interference, is much shorter.

The sensor of this invention meets all standard requirements, including having a detection flow range of at least 1.25 to 125 fps resulting in a turndown ratio of 100:1. However, it has been found that the turndown ratio of a sensor constructed in accordance with this invention can be as high as 200:1. This is a relatively wide range within which the sensor element can be accurate. Another advantage of the present invention is that it is contemplated to be a single process penetration sensor, eliminating separate temperature/pressure transmitters and additional sensor probes as are required or contemplated by many prior art devices, including that of FIG. 1.

Figure 4:
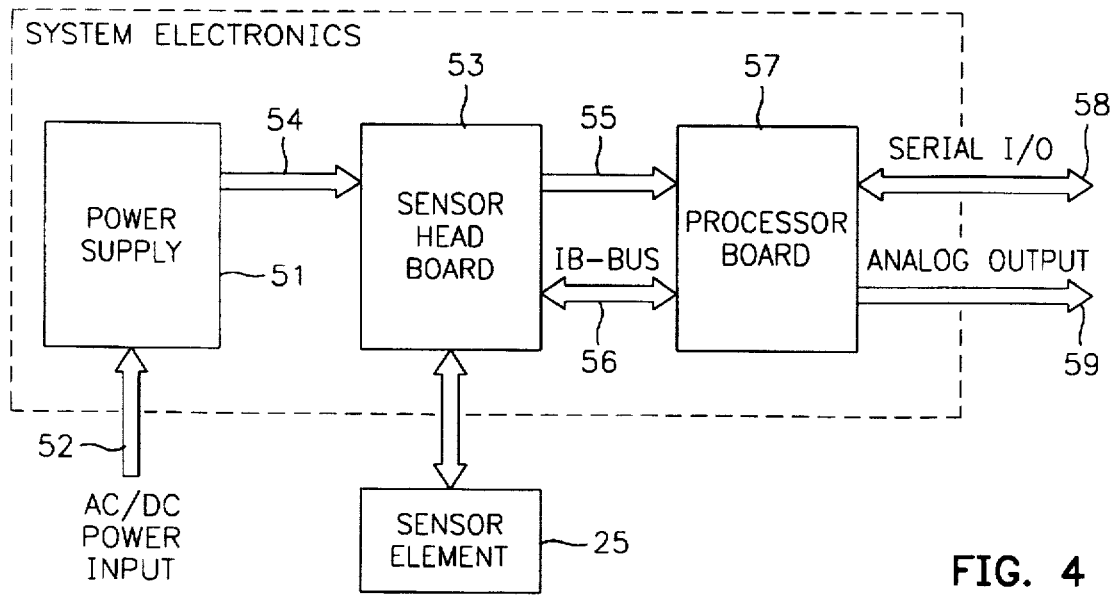
FIG. 4 is a basic block diagram of the electronics to which the sensor of the invention is connected and which provide the signal processing of the sensor outputs.
Figure 5:
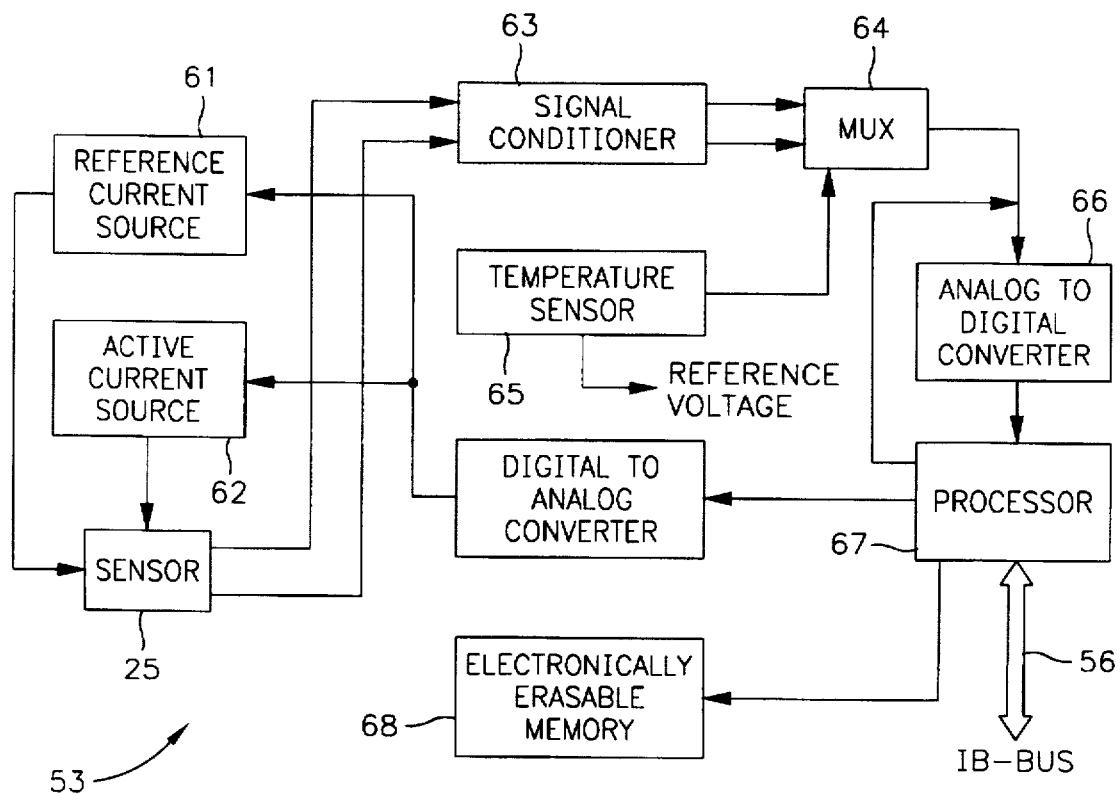
FIG. 5 is a more detailed block diagram of the sensor head board of FIG. 4.
Figure 6:
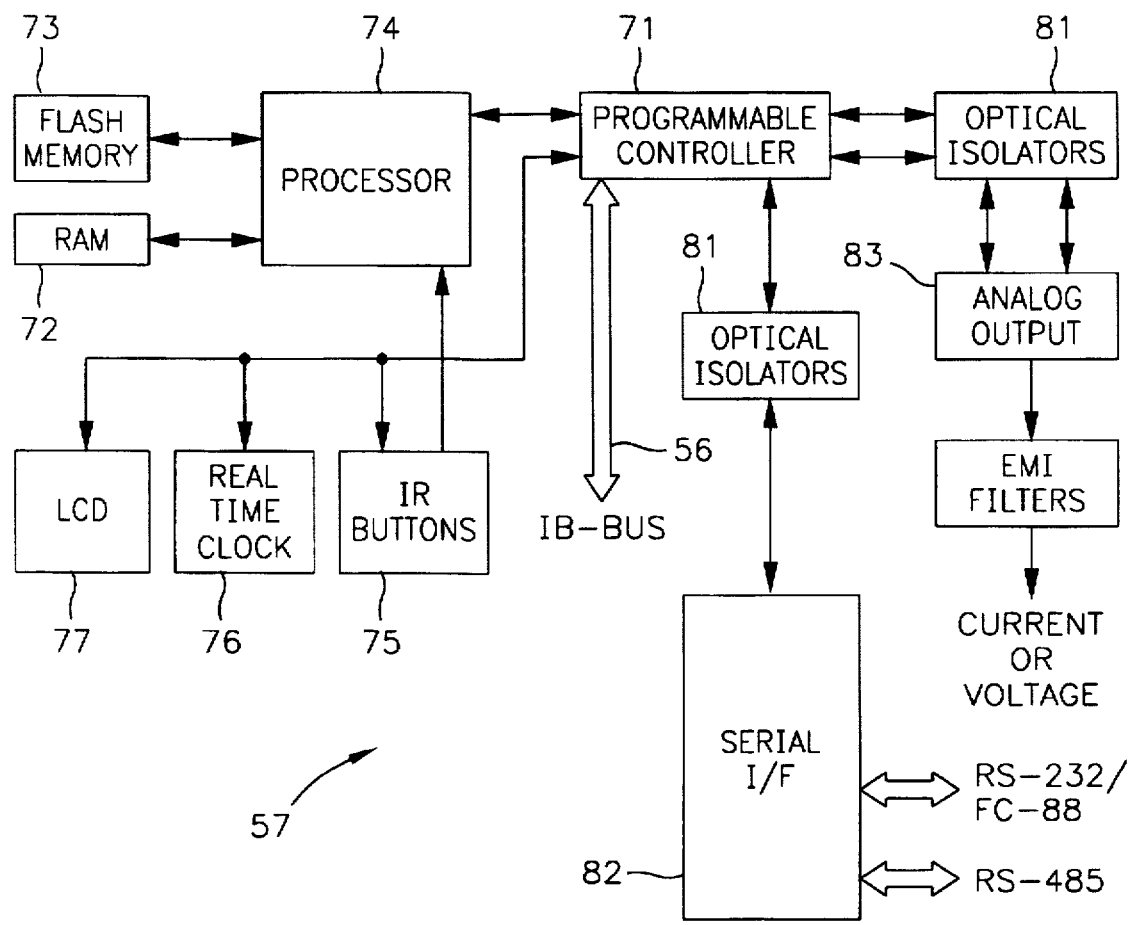
FIG. 6 is a more detailed block diagram of the processor board of FIG. 4.

For purposes of completeness, appropriate electronic circuitry appears in FIGS. 4–6 in block diagram form. This circuitry could be positioned immediately outside the conduit and connected to the end of the probe which extends through the wall of the conduit. Final processing would normally be conducted at a central location. Alternatively, all of the circuitry shown could be at a central, remote, location.

FIG. 4 shows a block diagram of the general case system electronics. Power supply 51 is powered by AC or DC input source power through line 52. Appropriate power and signals to sensor head board 53 is provided from the power supply through connection 54 and from the outputs of sensor 25 of FIG. 2. Input/output 56 from the sensor board supplies information to processor board 57. Line 55 provides power to the processor board. Bus 58 represents an input/output bus to the user's control station, normally a computer. Bus 59 provides an analog output from the processor for another aspect of user control. A person of ordinary skill in the signal processing field would readily understand the functions of these various blocks and how the sensor signals are to be handled to obtain the useful information for which the sensor is intended. However, further breakdown of the blocks of FIG. 4 are provided in FIGS. 5 and 6 in order to further detail some of the ways in which the sensor signals are processed for useful information. It is to be understood that the invention primarily relates to the improvements in the sensor structure itself and its ability to obtain accurate signals representative of flow characteristics, even at very low flow rates, rather than in how the signals are processed.

Sensor head board 53, likely mounted in a housing immediately adjacent the conduit into which sensor 25 projects, such as housing 13 through conduit wall 12 of FIG. 1, is shown in more detail in FIG. 5. Sensor 25 has current inputs from reference sensor current source 61 and active sensor current source 62. The sensor outputs are coupled to signal conditioner 63 and then to multiplexer 64 where the output of temperature sensor 65 is combined with the conditioned sensor signals. The temperatures recorded are for the inside of the electronics housing, and temperatures in the conduit or sensor itself. The sensor signals are then converted to digital form in A/D converter 66 and processed in processor 67. EE memory 68 stores set up and calibration data.

Processor board 57 is shown in more detail in FIG. 6. Processor 67 in board 53 and programmable controller 71 in board 57 are interconnected by interboard (IB) bus 56. RAM 72 and flash memory 73 provide program memory for processor 74. Operator control and adjustment IR buttons 75 and real time clock 76 provide appropriate control and time information to processor 74. LCD 77 is a readout for the sensor readings. Optical isolators 81 provide the usual safety features for board 57. Serial interface 82 provides the interface between the RS-232 and RS-485 buses and the rest of board 57. The RS buses couple an external computer to the sensor electronics for communication therebetween. Analog output 83 provides signals for user control purposes.

The boards described above employ conventional off-the-shelf components. Their functions are straightforward and well known to those of ordinary skill in the relevant area of technology.

In view of the description above, it is likely that modifications and improvements will occur to those skilled in the relevant technical field. It is to be understood that the invention is limited only by the spirit and scope of the accompanying claims.

What is claimed is:

1. A thermal fluid flow sensor for determining mass flow of a fluid in a conduit, said sensor comprising:
   a probe adapted to project laterally into the fluid flow conduit, said probe having a longitudinal axis, a proximal end and a distal end;
   an opening transversely through said probe adjacent said distal end thereof;
   a reference sensor disposed substantially on said longitudinal axis of said probe and projecting into said opening; and
   an active sensor disposed substantially on said longitudinal axis of said probe and projecting into said opening;
   said reference sensor and said active sensor being secured to opposite sides of said opening, their distal ends being spaced within said opening.

2. The sensor recited in claim 1, and further comprising a turbulence inducing element secured across said opening at about a 90 degree angle to said sensors and adapted to be located upstream from said active sensor when mounted in said conduit.

3. The sensor recited in claim 1, wherein the distance between said distal ends of said sensors preferably ranges between about 0.03 and 1.00 inch.

4. The sensor recited in claim 2, wherein the distance between said distal ends of said sensors preferably ranges between about 0.30 and 1.00 inch.

5. The sensor recited in claim 3, wherein said distance between said distal ends of said sensors is about 0.30 inch.

6. The sensor recited in claim 4, wherein said distance between said distal ends of said sensors is about 0.30 inch.

7. The sensor recited in claim 1, wherein said probe is shaped and configured so that said opening is adapted to be approximately centered within said conduit.

8. The sensor recited in claim 2, wherein said probe is shaped and configured so that said opening is adapted to be approximately centered within said conduit.

9. The sensor recited in claim 1, wherein said opening is elongated.

10. The sensor recited in claim 2, wherein said opening is elongated.

11. The sensor recited in claim 2, wherein said turbulence inducing element is spaced from said active sensor by about 0.30 to about 0.50 inch.

12. The sensor recited in claim 2, wherein said turbulence inducing element is spaced from said active sensor a minimum distance which permits conditioned flow to said active sensor to be properly developed while being within a maximum distance to prevent non-conditioned fluid flow from encountering said active sensor.

13. The sensor recited in claim 2, wherein said active sensor is elongated and said turbulence inducing element is positioned approximately midway along the length of said active sensor.

14. The sensor recited in claim 2, wherein said active sensor is elongated and has an axis and a predetermined length, said turbulence inducing element has a cross-sectional dimension parallel to said axis of said active sensor that is no more than about 25% of said predetermined length.

15. The sensor recited in claim 11, wherein said turbulence inducing element has a cross-sectional dimension ranging between about 0.062 and about 0.093 inch.

16. The sensor recited in claim 14, wherein said active sensor has a length of about 0.4 inch, said turbulence inducing element has a cross-section between about 0.062 and about 0.093 inch and is spaced from said active sensor by about 0.30 to about 0.50 inch.

17. A thermal fluid flow sensor for determining mass flow of a fluid in a conduit, said sensor comprising:
   a probe adapted to project laterally into the fluid flow conduit, said probe having a longitudinal axis a proximal end and a distal end;
   an elongated opening transversely through said probe adjacent said distal end thereof;
   a reference sensor disposed substantially on said longitudinal axis of said probe and projecting into said elongated opening; and
   an active sensor substantially on said longitudinal axis of said probe and projecting into said elongated opening;
   said reference sensor and said active sensor being secured to opposite sides of said elongated opening, their distal ends being spaced within said elongated opening;
   wherein said probe is shaped and configured so that said opening is adapted to be approximately centered within said conduit.

18. A thermal fluid flow sensor for determining mass flow of a fluid in a conduit, said sensor comprising:
   a probe adapted to project laterally into the fluid flow conduit, said probe having a longitudinal axis a proximal end and a distal end;
   an elongated opening transversely through said probe adjacent said distal end thereof;
   a reference sensor disposed substantially on said longitudinal axis of said probe and projecting into said elongated opening;
   an active sensor disposed substantially on said longitudinal axis of said probe and projecting into said elongated opening; and
   a turbulence inducing element secured across said opening at about a 90 degree angle to said sensors and adapted to be located upstream from said active sensor when said thermal fluid flow sensor is mounted in said conduit;
   said reference sensor and said active sensor being secured to opposite sides of said elongated opening, their distal ends being spaced within said elongated opening.

19. A method of sensing mass flow in a conduit, the method comprising the steps of:
   preparing an insertion sensor having an extended probe with an opening therethrough adjacent its distal end, and electrical connections at its proximal end said probe having a longitudinal axis;

mounting an active sensor and a reference sensor in generally axial spaced relationship within the on said longitudinal axis;

forming an opening in the sidewall of the conduit;

inserting the probe through the opening and mounting the sensor to the side wall of the conduit so that the space between the sensor elements is substantially on the fluid flow axis of the conduit; and arranging the opening to be in general alignment with fluid flow in the conduit.

20. The method recited in claim 19, and comprising the further steps of:

mounting a turbulence inducing element across said opening at about a 90 degree angle to said sensors and spaced from said active sensor; and positioning the opening through the probe so that the turbulence inducing element is upstream from the active sensor.

21. The method recited in claim 20, wherein the active sensor is elongated, and the turbulence inducing element is positioned midway along the length of the active sensor.

* * * * *